(12) United States Patent
Zhang et al.

(10) Patent No.: US 10,638,466 B2
(45) Date of Patent: Apr. 28, 2020

(54) DATA TRANSMISSION METHOD USING FRACTIONAL PHYSICAL RESOURCE BLOCKS, AND DEVICE THEREFOR

(71) Applicant: Huawei Technologies Co., Ltd., Shenzhen (CN)

(72) Inventors: Yi Zhang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 251 days.

(21) Appl. No.: 15/678,384

(22) Filed: Aug. 16, 2017

(65) Prior Publication Data

US 2017/0347344 A1 Nov. 30, 2017

Related U.S. Application Data

(63) Continuation of application No. PCT/CN2015/073188, filed on Feb. 16, 2015.

(51) Int. Cl.
*H04W 72/04* (2009.01)
*H04L 5/00* (2006.01)
(Continued)

(52) U.S. Cl.
CPC ............ *H04W 72/042* (2013.01); *H04L 5/00* (2013.01); *H04L 5/0037* (2013.01); *H04L 5/0044* (2013.01); *H04L 5/0051* (2013.01); *H04L 5/0053* (2013.01); *H04L 5/0091* (2013.01); *H04W 88/02* (2013.01); *H04W 88/08* (2013.01)

(58) Field of Classification Search
CPC ... H04W 72/042; H04L 5/0091; H04L 5/0053
See application file for complete search history.

(56) References Cited

U.S. PATENT DOCUMENTS

| | | | |
|---|---|---|---|
| 2014/0029537 | A1 | 1/2014 | Golitschek Edler von Elbwart et al. |
| 2014/0071914 | A1 | 3/2014 | Li et al. |

(Continued)

FOREIGN PATENT DOCUMENTS

| | | |
|---|---|---|
| CN | 102196570 A | 9/2011 |
| CN | 103220103 A | 7/2013 |

(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 12), Technical Specification, 3GPP TS 36.212 v12.3.0, (Dec. 2014), 89 pages.

*Primary Examiner* — Hoon J Chung
(74) *Attorney, Agent, or Firm* — Slater Matsil, LLP

(57) ABSTRACT

Embodiments of the present invention relate to the field of communications technologies. The method includes: determining, according to a fractional physical resource block (F-PRB) resource index allocated to UE and according to a quantity of F-PRBs included in each physical resource block PRB pair, an antenna port used to send data to the UE; sending downlink control information (DCI) to the UE, where a transmission format of the DCI is DCI 1A, and carries the F-PRB resource index that is allocated to the UE; and sending the data to the UE by using the antenna port.

18 Claims, 9 Drawing Sheets

(51) Int. Cl.
*H04W 88/02* (2009.01)
*H04W 88/08* (2009.01)

(56) References Cited

U.S. PATENT DOCUMENTS

2015/0009927 A1    1/2015  Larsson et al.
2015/0110033 A1*   4/2015  Yi .................... H04L 1/0025
                                                    370/329

FOREIGN PATENT DOCUMENTS

| CN | 103548407 A | 1/2014 |
| CN | 103684701 A | 3/2014 |
| CN | 104106231 A | 10/2014 |
| EP | 2790367 A1 | 10/2014 |
| EP | 2849358 A1 | 3/2015 |
| WO | 2013168942 A1 | 11/2013 |

\* cited by examiner

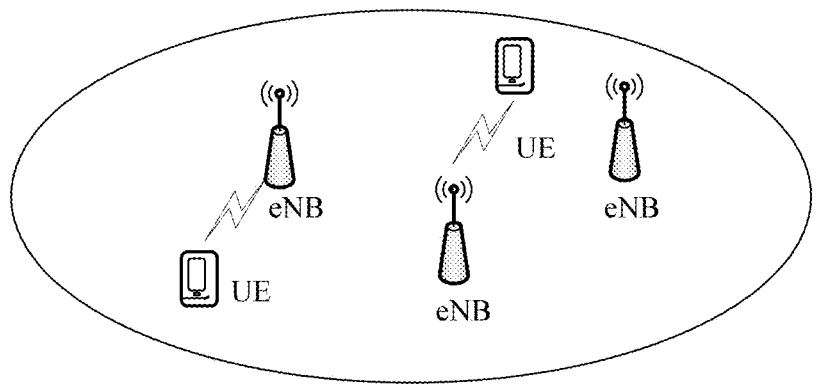

FIG. 1

```
┌─────────────────────────────────────────────────┐  201
│ A base station determines, according to a       │
│ fractional physical resource block F-PRB        │
│ resource index allocated to user equipment      │
│ and a quantity of F-PRBs included in a physical │
│ resource block pair, an antenna port used to    │
│ transmit data to the user equipment             │
└─────────────────────────────────────────────────┘
                      │
                      ▼
┌─────────────────────────────────────────────────┐  202
│ The base station sends DCI to the user equipment│
└─────────────────────────────────────────────────┘
                      │
                      ▼
┌─────────────────────────────────────────────────┐  203
│ The base station sends data to the user         │
│ equipment by using the antenna port             │
└─────────────────────────────────────────────────┘
```

FIG. 2

DATA TRANSMISSION METHOD USING FRACTIONAL PHYSICAL RESOURCE BLOCKS, AND DEVICE THEREFOR

CROSS-REFERENCE TO RELATED APPLICATIONS

This application is a continuation of International Application No. PCT/CN2015/073188, filed on Feb. 16, 2015, the disclosure of which is hereby incorporated by reference in its entirety.

TECHNICAL FIELD

The present invention relates to the field of communications technologies, and in particular, to a data transmission method and a device.

BACKGROUND

With the development of the 3GPP (Third Generation Partnership Project) and enhancement of a voice encoding technology, voice quality the same as that of a conventional voice service at a rate of 12.2 kbps can be achieved by using only a transmission rate of 5.9 kbps. Currently, a transport block size (assuming that there is no padding bit) corresponding to a voice frame is far smaller than a transport block size corresponding to a conventional voice service. As a transport block becomes smaller, one transport block does not require an entire resource block for data transmission when signal quality is desirable. However, currently, a minimum resource allocation unit of a data service is one resource block, and this causes a waste of transmission resources. Therefore, transmission resources urgently need to be used more appropriately for transmission, to avoid a waste of transmission resources.

SUMMARY

To avoid a waste of transmission resources, embodiments of the present invention provide a data transmission method and a device. The technical solutions are as follows:

According to a first aspect, a data transmission method is provided. The method includes determining, by a base station according to a quantity of F-PRBs included in a physical resource block PRB pair and a fractional physical resource block F-PRB resource index allocated to user equipment, an antenna port used to send data to the user equipment. The method also includes sending, by the base station, downlink control information DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and the quantity that is of the F-PRBs included in the PRB pair and that is obtained by the user equipment. The method also includes sending, by the base station, the data to the user equipment by using the antenna port.

In a first possible implementation of the first aspect, the determining, according to an F-PRB resource index allocated to user equipment and a quantity of F-PRBs included in a PRB pair, an antenna port used to send data to the user equipment is specifically: determining an antenna port index according to the F-PRB resource index allocated to the user equipment and the quantity of the F-PRBs included in the PRB pair; and determining, according to the antenna port index, the antenna port used to send data to the user equipment.

With reference to the first possible implementation of the first aspect, in a second possible implementation of the first aspect, the determining an antenna port index according to the F-PRB resource index allocated to the user equipment and the quantity of the F-PRBs included in the PRB pair is specifically: using, as the antenna port index, a remainder that is obtained by dividing the F-PRB resource index allocated to the user equipment by the quantity of the F-PRBs included in the PRB pair.

According to a second aspect, a data transmission method is provided. The method includes: determining, by a base station, an antenna port set according to a quantity of F-PRBs included in a physical resource block PRB pair and according to a fractional physical resource block F-PRB resource index allocated to user equipment; determining, by the base station from the antenna port set, an antenna port used to send data to the user equipment; sending, by the base station, downlink control information DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment; and sending, by the base station, the data to the user equipment by using the antenna port.

In a first possible implementation of the second aspect, the method further includes: determining, by the base station, a scrambling identity of the user equipment, where the information indication of the candidate antenna port is further determined according to the scrambling identity.

With reference to the second aspect or the first possible implementation of the second aspect, in a second possible implementation of the second aspect, the determining, by a base station, an antenna port set according to an F-PRB resource index allocated to user equipment and according to a quantity of F-PRBs included in a PRB pair is specifically: determining an antenna port index according to the F-PRB resource index allocated to the user equipment and according to the quantity of the F-PRBs included in the PRB pair; and determining the antenna port set according to the antenna port index.

With reference to the second possible implementation of the second aspect, in a third possible implementation of the second aspect, the determining an antenna port index according to the F-PRB resource index allocated to the user equipment and according to the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing the F-PRB resource index compliant with the selection rule by the quantity of the F-PRBs included in the PRB pair.

With reference to the second possible implementation of the second aspect, in a fourth possible implementation of the second aspect, the determining an antenna port index according to the F-PRB resource index allocated to the user equipment and according to the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

With reference to the third or the fourth possible implementation of the second aspect, in a fifth possible implementation of the second aspect, the F-PRB resource index compliant with the selection rule is a smallest F-PRB resource index in the F-PRB resource index allocated to the user equipment.

With reference to any one of the second aspect, or the first to the fifth possible implementations of the second aspect, in a sixth possible implementation of the second aspect, when the quantity of the F-PRBs included in the PRB pair is 2, the information indication of the candidate antenna port is further determined according to a transmission frame structure.

With reference to any one of the second aspect, or the first to the sixth possible implementations of the second aspect, in a seventh possible implementation of the second aspect, the information indication of the candidate antenna port is carried by using the antenna port, the scrambling identity, and a layer quantity indication.

According to a third aspect, a data transmission method is provided. The method includes: receiving, by user equipment, downlink control information DCI sent by a base station, where a transmission format of the DCI is DCI 1A, and the DCI carries a fractional physical resource block F-PRB resource index that is allocated to the user equipment. The method also includes determining, by the user equipment according to the F-PRB resource index allocated to the user equipment and a quantity that is of F-PRBs included in a PRB pair and that is obtained by the user equipment, an antenna port used by the base station to send data to the user equipment. The method also includes receiving, by the user equipment, data sent by the base station by using the antenna port.

In a first possible implementation of the third aspect, the determining, according to the F-PRB resource index allocated to the user equipment and a quantity of F-PRBs included in a PRB pair, an antenna port used by the base station to send data includes: determining an antenna port index according to the F-PRB resource index allocated to the user equipment and the quantity of the F-PRBs included in the PRB pair; and determining, according to the antenna port index, the antenna port used by the base station to send data to the user equipment.

With reference to the first possible implementation of the third aspect, in a second possible implementation of the third aspect, the determining an antenna port index according to the F-PRB resource index allocated to user equipment and the quantity of the F-PRBs included in the PRB pair is specifically: using, as the antenna port index, a remainder that is obtained by dividing the F-PRB resource index allocated to the user equipment by the quantity of the F-PRBs included in the PRB pair.

According to a fourth aspect, a data transmission method is provided. The method includes receiving, by user equipment, downlink control information DCI sent by a base station, where a transmission format of the DCI is DCI 2C or DCI 2D, and the DCI carries an information indication of a candidate antenna port and a fractional physical resource block F-PRB resource index that is allocated to the user equipment. The method also includes determining, by the user equipment, an antenna port set according to the F-PRB resource index allocated to the user equipment and according to a quantity that is of F-PRBs included in a PRB pair and that is obtained by the user equipment. The method also includes determining, by the user equipment, a candidate antenna port according to the information indication of the candidate antenna port. The method also includes determining, by the user equipment, according to the antenna port set and the candidate antenna port, an antenna port used by the base station to send data to the user equipment. The method also includes receiving, by the user equipment, data sent by the base station by using the antenna port used to send data to the user equipment.

In a first possible implementation of the fourth aspect, the determining an antenna port set according to an F-PRB resource index allocated to the user equipment and according to a quantity of F-PRBs included in a PRB pair is specifically: determining an antenna port index according to the F-PRB resource index allocated to the user equipment and according to the quantity of the F-PRBs included in the PRB pair; and determining the antenna port set according to the antenna port index.

With reference to the first possible implementation of the fourth aspect, in a second possible implementation of the fourth aspect, the determining an antenna port index according to the F-PRB resource index allocated to the user equipment and according to the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing the F-PRB resource index compliant with the selection rule by the quantity of the F-PRBs included in the PRB pair.

With reference to the first possible implementation of the fourth aspect, in a third possible implementation of the fourth aspect, the determining an antenna port index according to the F-PRB resource index allocated to the user equipment and according to the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

With reference to the second or the third possible implementation of the fourth aspect, in a fourth possible implementation of the fourth aspect, the F-PRB resource index compliant with the selection rule is a smallest F-PRB resource index in the F-PRB resource index allocated to the user equipment.

With reference to any one of the fourth aspect, or the first to the fourth possible implementations of the fourth aspect, in a fifth possible implementation of the fourth aspect, when the quantity of the F-PRBs included in the PRB pair is 2, the user equipment further determines the candidate antenna port according to a transmission frame structure.

With reference to any one of the fourth aspect, or the first to the fifth possible implementations of the fourth aspect, in a sixth possible implementation of the fourth aspect, the information indication of the candidate antenna port is carried by using the antenna port, a scrambling identity, and a layer quantity indication.

According to a fifth aspect, a base station is provided. The base station includes a processing unit, configured to determine, according to a quantity of F-PRBs included in a physical resource block PRB pair and a fractional physical resource block F-PRB resource index allocated to user equipment, an antenna port used to send data to the user equipment. The base station also includes a sending unit, configured to send downlink control information DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and the quantity that is of the F-PRBs included in the PRB pair and that is obtained by the user equipment. The sending unit is further configured to send the data to the user equipment by using the antenna port.

In a first possible implementation of the fifth aspect, the processing unit is specifically configured to: determine an antenna port index according to the F-PRB resource index allocated to the user equipment and the quantity of the F-PRBs included in the PRB pair; and determine, according to the antenna port index, the antenna port used to send data to the user equipment.

With reference to the first possible implementation of the fifth aspect, in a second possible implementation of the fifth aspect, the processing unit is configured to use, as the antenna port index, a remainder that is obtained by dividing the F-PRB resource index allocated to the user equipment by the quantity of the F-PRBs included in the PRB pair.

According to a sixth aspect, a base station is provided. The base station includes a processing unit, configured to determine an antenna port set according to a quantity of F-PRBs included in a physical resource block PRB pair and according to a fractional physical resource block F-PRB resource index allocated to user equipment. The processing unit is further configured to determine, from the antenna port set, an antenna port used to send data to the user equipment. The base station also includes a sending unit, configured to send downlink control information DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment. The sending unit is further configured to send the data to the user equipment by using the antenna port.

In a first possible implementation of the sixth aspect, the processing unit is further configured to determine a scrambling identity of the user equipment, where the information indication of the candidate antenna port is further determined according to the scrambling identity.

With reference to the sixth aspect or the first possible implementation of the sixth aspect, in a second possible implementation of the sixth aspect, the processing unit is specifically configured to: determine an antenna port index according to the F-PRB resource index allocated to the user equipment and according to the quantity of the F-PRBs included in the PRB pair; and determine the antenna port set according to the antenna port index.

With reference to the second possible implementation of the sixth aspect, in a third possible implementation of the sixth aspect, the processing unit is specifically configured to: select, from the F-PRB resource index allocated to the user equipment, an F-PRB resource index compliant with a selection rule, where both the base station and the user equipment comply with the selection rule; and use, as the antenna port index, a remainder that is obtained by dividing the F-PRB resource index compliant with the selection rule by the quantity of the F-PRBs included in the PRB pair.

With reference to the second possible implementation of the sixth aspect, in a fourth possible implementation of the sixth aspect, the processing unit is specifically configured to: select, from the F-PRB resource index allocated to the user equipment, an F-PRB resource index compliant with a selection rule, where both the base station and the user equipment comply with the selection rule; and use, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

With reference to the third or the fourth possible implementation of the sixth aspect, in a fifth possible implementation of the sixth aspect, the F-PRB resource index compliant with the selection rule is a smallest F-PRB resource index in the F-PRB resource index allocated to the user equipment.

With reference to any one of the sixth aspect, or the first to the fifth possible implementations of the sixth aspect, in a sixth possible implementation of the sixth aspect, when the quantity of the F-PRBs included in the PRB pair is 2, the information indication of the candidate antenna port is further determined according to a transmission frame structure.

With reference to any one of the sixth aspect, or the first to the sixth possible implementations of the sixth aspect, in a seventh possible implementation of the sixth aspect, the information indication of the candidate antenna port is carried by using the antenna port, the scrambling identity, and a layer quantity indication.

According to a seventh aspect, user equipment is provided. The user equipment includes a receiving unit, configured to receive downlink control information DCI sent by a base station, where a transmission format of the DCI is DCI 1A, and the DCI carries a fractional physical resource block F-PRB resource index that is allocated to the user equipment. The user equipment also includes a processing unit, configured to determine, according to the F-PRB resource index allocated to the user equipment and a quantity that is of F-PRBs included in a PRB pair and that is obtained by the user equipment, an antenna port used by the base station to send data to the user equipment. The receiving unit is further configured to receive data sent by the base station by using the antenna port.

In a first possible implementation of the seventh aspect, the processing unit is configured to: determine an antenna port index according to the F-PRB resource index allocated to the user equipment and the quantity of the F-PRBs included in the PRB pair; and determine, according to the antenna port index, the antenna port used by the base station to send data to the user equipment.

With reference to the first possible implementation of the seventh aspect, in a second possible implementation of the seventh aspect, the processing unit is configured to use, as the antenna port index, a remainder that is obtained by dividing the F-PRB resource index allocated to the user equipment by the quantity of the F-PRBs included in the PRB pair.

According to an eighth aspect, user equipment is provided. The user equipment includes a receiving unit, configured to receive downlink control information DCI sent by a base station, where a transmission format of the DCI is DCI 2C or DCI 2D, and the DCI carries an information indication of a candidate antenna port and a fractional physical resource block F-PRB resource index that is allocated to the user equipment. The user equipment also includes a processing unit, configured to determine an antenna port set according to the F-PRB resource index allocated to the user equipment and according to a quantity that is of F-PRBs included in a PRB pair and that is obtained by the user equipment. The processing unit is further configured to determine a candidate antenna port according to the information indication of the candidate antenna port; and the processing unit is further configured to determine, according to the antenna port set and the candidate antenna port, an antenna port used by the base station to send data to the user equipment. The receiving unit is further configured to receive data sent by the base station by using the antenna port used to send data to the user equipment.

In a first possible implementation of the eighth aspect, the processing unit is configured to: determine an antenna port index according to the F-PRB resource index allocated to the user equipment and according to the quantity of the F-PRBs included in the PRB pair; and determine the antenna port set according to the antenna port index.

With reference to the first possible implementation of the eighth aspect, in a second possible implementation of the eighth aspect, the processing unit is configured to: select, from the F-PRB resource index allocated to the user equipment, an F-PRB resource index compliant with a selection rule, where both the base station and the user equipment comply with the selection rule; and use, as the antenna port index, a remainder that is obtained by dividing the F-PRB resource index compliant with the selection rule by the quantity of the F-PRBs included in the PRB pair.

With reference to the first possible implementation of the eighth aspect, in a third possible implementation of the eighth aspect, the processing unit is configured to: select, from the F-PRB resource index allocated to the user equipment, an F-PRB resource index compliant with a selection rule, where both the base station and the user equipment comply with the selection rule; and use, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

With reference to the second or the third possible implementation of the eighth aspect, in a fourth possible implementation of the eighth aspect, the F-PRB resource index compliant with the selection rule is a smallest F-PRB resource index in the F-PRB resource index allocated to the user equipment.

With reference to any one of the eighth aspect, or the first to the fourth possible implementations of the eighth aspect, in a fifth possible implementation of the eighth aspect, when the quantity of the F-PRBs included in the PRB pair is 2, the processing unit is further configured to determine the candidate antenna port according to a transmission frame structure.

With reference to any one of the eighth aspect, or the first to the fifth possible implementations of the eighth aspect, in a sixth possible implementation of the eighth aspect, the information indication of the candidate antenna port is carried by using the antenna port, a scrambling identity, and a layer quantity indication.

According to a ninth aspect, a base station is provided, where the base station includes: a transmitter, a receiver, a memory, and a processor connected to the transmitter, the receiver, and the memory. The memory stores a group of program code, and the processor is configured to call the program code stored in the memory to perform the following operations: determining, according to a quantity of F-PRBs included in a physical resource block PRB pair and a fractional physical resource block F-PRB resource index allocated to user equipment, an antenna port used to send data to the user equipment; sending downlink control information DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and according to the quantity that is of the F-PRBs included in the PRB pair and that is obtained by the user equipment; and sending the data to the user equipment by using the antenna port.

According to a tenth aspect, a base station is provided, where the base station includes: a transmitter, a receiver, a memory, and a processor connected to the transmitter, the receiver, and the memory; the memory stores a group of program code; and the processor is configured to call the program code stored in the memory to perform the following operations: determining an antenna port set according to a quantity of F-PRBs included in a physical resource block PRB pair and according to a fractional physical resource block F-PRB resource index allocated to user equipment; determining, from the antenna port set, an antenna port used to send data to the user equipment; sending downlink control information DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment; and sending the data to the user equipment by using the antenna port.

According to an eleventh aspect, user equipment is provided, where the user equipment includes: a transmitter, a receiver, a memory, and a processor connected to the transmitter, the receiver, and the memory; the memory stores a group of program code. The processor is configured to call the program code stored in the memory to perform following operations: receiving downlink control information DCI sent by a base station, where a transmission format of the DCI is DCI 1A, and the DCI carries a fractional physical resource block F-PRB resource index that is allocated to the user equipment; determining, according to the F-PRB resource index allocated to the user equipment and a quantity that is of F-PRBs included in a PRB pair and that is obtained by the user equipment, an antenna port used by the base station to send data to the user equipment; and receiving data sent by the base station by using the antenna port.

According to a twelfth aspect, user equipment is provided. The user equipment includes: a transmitter, a receiver, a memory, and a processor connected to the transmitter, the receiver, and the memory; the memory stores a group of program code. The processor is configured to call the program code stored in the memory to perform following operations: receiving downlink control information DCI sent by a base station, where a transmission format of the DCI is DCI 2C or DCI 2D, and the DCI carries an information indication of a candidate antenna port and a fractional physical resource block F-PRB resource index that is allocated to the user equipment; determining an antenna port set according to the F-PRB resource index allocated to the user equipment and according to a quantity that is of F-PRBs included in a PRB pair and that is obtained by the user equipment; determining a candidate antenna port according to the information indication of the candidate antenna port; determining, according to the antenna port set and the candidate antenna port, an antenna port used by the base station to send data to the user equipment; and receiving data sent by the base station by using the antenna port used to send data to the user equipment.

Beneficial effects of the technical solutions provided in the embodiments of the present invention are as follows: User equipment determines, according to a fractional physical resource block (F-PRB) resource index carried in received downlink control information (DCI), an antenna port used to send data to the user equipment, so that the user equipment can learn the antenna port and an F-PRB resource that are used by a base station to send data, and perform data reception. The user equipment can use the F-PRB to receive data sent by the base station. Because the F-PRB resource is smaller than an existing minimum transmission resource block PRB pair resource, when an entire resource block is not required for a transport block, transmission resource utilization is greatly improved, and a waste of transmission resources is avoided. Therefore, a more appropriate transmission resource utilization manner is provided.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic structural diagram of a communications system used in embodiments of the present invention;

FIG. 2 is a schematic flowchart of a data transmission method according to an embodiment of the present invention;

DETAILED DESCRIPTION OF ILLUSTRATIVE EMBODIMENTS

Figure 3:
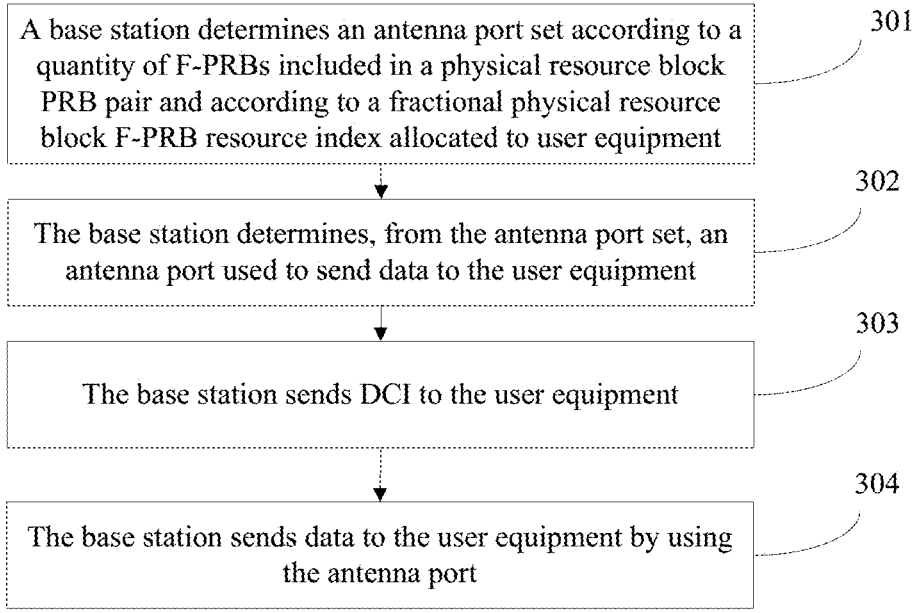
FIG. 3 is a schematic flowchart of a data transmission method according to an embodiment of the present invention.

To make the objectives, technical solutions, and advantages of the present invention clearer, the following further describes the embodiments of the present invention in detail with reference to the accompanying drawings.

FIG. 1 is a schematic structural diagram of a communications system used in each embodiment of the present invention. Referring to FIG. 1, the communications system includes a base station and user equipment (UE), and the user equipment is within a coverage area of the base station. The base station may be an evolved NodeB (evolved Node B), or may be a base station device configured to provide a communications service, such as a home eNodeB (HeNB), an AP, a micro base station, or a pico base station. The user equipment may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, or the like.

In the embodiments of the present invention, each physical resource block pair (PRB pair) may be divided into multiple fractional physical resource blocks (F-PRB). For example, each PRB pair is divided into two fractional physical resource blocks (F-PRB) or four F-PRBs. Certainly, each PRB pair may also include different quantities of F-PRBs. A division quantity is not limited in the embodiments of the present invention. To adapt to a data transmission requirement, sizes of all F-PRBs may be the same or may be different. In the embodiments of the present invention, a scenario in which each PRB pair includes two F-PRBs and a scenario in which each PRB pair includes four F-PRBs are merely used for description. However, the embodiments of the present invention are not limited thereto. For ease of description, in the following, ½ F-PRB represents a scenario in which each PRB pair includes two F-PRBs, and ¼ F-PRB represents a scenario in which each PRB pair includes four F-PRBs.

After a PRB pair is divided, resource indexes may be allocated to F-PRBs obtained by means of division. For example, in a scenario in which each PRB pair includes two F-PRBs, 0 and 1 are used as resource indexes of the F-PRBs; and in a scenario in which each PRB pair includes four F-PRBs, 0, 1, 2, and 3 are used as resource indexes of the F-PRBs. Certainly, such examples are cases in which F-PRBs obtained by dividing each PRB pair are identified. In a transmission scenario in which there are multiple PRB pairs, F-PRBs obtained by means of division may be identified according to sequences both in a time domain and in a frequency domain of the PRB pairs. For example, two F-PRBs obtained by dividing the eleventh PRB pair may be identified with 110 and 111 respectively. All the resource index values herein are used as examples, and a representation form of an actual resource index value is not limited.

In the embodiments of the present invention, the base station and the user equipment may learn, according to a protocol that both the base station and the user equipment comply with, a quantity of F-PRBs included in each PRB pair. Alternatively, the base station may first learn a quantity of F-PRBs included in each PRB pair, and then notify, by using a system broadcast message, the user equipment of the quantity of the F-PRBs included in each PRB pair. This is not limited.

FIG. 2 is a schematic flowchart of a data transmission method according to an embodiment of the present invention. The method may be applied to a scenario in which a transmission format of downlink control information DCI used by a base station is DCI 1A. Referring to FIG. 2, the method includes the following steps.

201. The base station determines, according to a fractional physical resource block F-PRB resource index allocated to user equipment and a quantity of F-PRBs included in a physical resource block pair (PRB pair), an antenna port used to send data to the user equipment.

202. The base station sends DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and the quantity that is of the F-PRBs included in the PRB pair and that is obtained by the user equipment.

203. The base station sends the data to the user equipment by using the antenna port.

According to the method provided in this embodiment of the present invention, on a base station side, the base station determines, according to an F-PRB resource index allocated to user equipment and a quantity of F-PRBs included in each PRB pair, an antenna port used to send data to the user equipment; the base station sends DCI to the user equipment, where the DCI carries the F-PRB resource index that is allocated to the user equipment, so that the user equipment can learn the antenna port used by the base station to send data. Therefore, the base station can send the data to the user equipment by using the antenna port and by using an F-PRB. Because an F-PRB resource is smaller than an existing minimum PRB pair resource, when an entire resource block is not required for a transport block, transmission resource utilization is greatly improved, and a waste of transmission resources is avoided. Therefore, a more appropriate transmission resource utilization manner is provided.

Optionally, the determining, according to an F-PRB resource index allocated to user equipment and a quantity of F-PRBs included in each PRB pair, an antenna port used to send data to the user equipment is specifically: determining an antenna port index according to the F-PRB resource index allocated to the user equipment and the quantity of the F-PRBs included in each PRB pair; and determining, according to the antenna port index, the antenna port used to send data to the user equipment.

Optionally, the determining an antenna port index according to the F-PRB resource index allocated to the user equipment and the quantity of the F-PRBs included in each PRB pair is specifically: using, as the antenna port index, a reminder that is obtained by dividing the F-PRB resource index allocated to the user equipment by the quantity of the F-PRBs included in each PRB pair.

That is, the antenna port index may be obtained through calculation by using a predetermined formula, and then the antenna port used to send data to the user equipment is determined according to a preset correspondence between an antenna port index and an antenna port (for example, by using a table capable of reflecting the correspondence).

All the foregoing optional technical solutions may be combined in any manner to form an optional embodiment of the present invention, and details are not described one by one herein.

FIG. 3 is a schematic flowchart of a data transmission method according to an embodiment of the present invention. The method may be applied to a scenario in which a transmission format of downlink control information DCI used by a base station is DCI 2C or DCI 2D. Referring to FIG. 3, the method includes the following steps.

301. The base station determines an antenna port set according to a quantity of F-PRBs included in a physical resource block PRB pair and according to a fractional physical resource block F-PRB resource index allocated to user equipment.

302. The base station determines, from the antenna port set, an antenna port used to send data to the user equipment.

303. The base station sends downlink control information DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment.

304. The base station sends the data to the user equipment by using the antenna port.

It should be noted that in this embodiment of the present invention, when the base station uses the DCI 2C format or the DCI 2D format, and the base station manages multiple user equipments, in the technical solution provided in this embodiment of the present invention, the base station may transmit data to the multiple user equipments by using different antenna ports and by reusing a same F-PRB resource. The F-PRB resource may be specifically reflected by using an F-PRB resource index. For example, the base station may allocate a same F-PRB resource index to different user equipments. For the different user equipments, the base station may select different antenna ports from the antenna port set for the different user equipments to transmit data. Therefore, after the user equipment side learns the ports used by the base station to send data to the user equipments, the base station may transmit data to the different user equipments by using the different antenna ports and by reusing the same F-PRB resource.

According to the method provided in this embodiment of the present invention, on a base station side, the base station determines an antenna port set according to an F-PRB resource index allocated to user equipment and a quantity of F-PRBs included in the PRB pair; determines, from the antenna port set, an antenna port used to send data to the user equipment; and sends DCI to the user equipment, where the DCI carries the F-PRB resource index allocated to the user equipment and a value of a designated information bit, so that the user equipment can learn the antenna port used by the base station to send data. Therefore, the base station can send data to the user equipment by using different antenna ports and by reusing a same F-PRB resource. Compared with the embodiment in FIG. 2 of the present invention, in this embodiment, transmission resource utilization is further improved, and a waste of transmission resources is avoided. Therefore, a more appropriate transmission resource utilization manner is provided.

Optionally, when the user equipment is differentiated from another user equipment, the method further includes: determining, by the base station, a scrambling identity of the user equipment, where the information indication of the candidate antenna port is further determined according to the scrambling identity. The scrambling identity may be "0" or "1". It should be noted that the base station may comprehensively use the scrambling identity and the selected antenna port, to obtain the information indication of the candidate antenna port in a manner of querying a predetermined correspondence (for example, by using a table capable of reflecting the correspondence).

When differentiation is not required, the scrambling identity is generally set to a default value, and the default value may be "0".

Optionally, the determining, by the base station, an antenna port set according to an F-PRB resource index allocated to user equipment and according to a quantity of F-PRBs included in a PRB pair is specifically: determining an antenna port index according to the F-PRB resource index allocated to the user equipment and according to the quantity of the F-PRBs included in the PRB pair; and determining the antenna port set according to the antenna port index.

Optionally, the determining an antenna port index according to the F-PRB resource index allocated to the user equipment and the quantity of the F-PRBs included in the PRB pair is specifically: selecting an F-PRB resource index compliant with a selection rule, where the F-PRB resource index compliant with the selection rule belongs to the F-PRB resource index allocated to the user equipment, and both the base station and the user equipment comply with the selection rule; and using, as the antenna port index, a reminder that is obtained by dividing the F-PRB resource index compliant with the selection rule by the quantity of the F-PRBs included in the PRB pair.

Optionally, the determining an antenna port index according to the F-PRB resource index allocated to the user equipment and the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

That is, the antenna port index may be obtained through calculation by using a predetermined formula, and then the antenna port set used to send data to the user equipment is determined according to a preset correspondence between an antenna port index and an antenna port (for example, by using a table capable of reflecting the correspondence).

Optionally, the F-PRB resource index compliant with the selection rule is a smallest F-PRB resource index in the F-PRB resource index allocated to the user equipment.

Optionally, when the quantity of the F-PRBs included in the PRB pair is 2, the designated information bit is further determined according to a transmission frame structure.

When the quantity of the F-PRBs included in the PRB pair is 2, the base station can further use an extended cyclic prefix (extended CP) frame structure to perform data transmission. However, the extended CP supports data transmission performed by using two antenna ports at maximum. Therefore, optionally, in this case, a relationship between the designated information bit, and the antenna port used to send data to the user equipment and a layer quantity is different from, when a normal cyclic prefix (normal CP) frame structure is used, a relationship between the designated information bit, and the antenna port used to send data to the user equipment and a layer quantity. Therefore, the designated information bit may be further determined according to the transmission frame structure.

Optionally, the information indication of the candidate antenna port is carried by using the antenna port, the scrambling identity, and a layer quantity indication.

All the foregoing optional technical solutions may be combined in any manner to form an optional embodiment of the present invention, and details are not described one by one herein.

Figure 4:
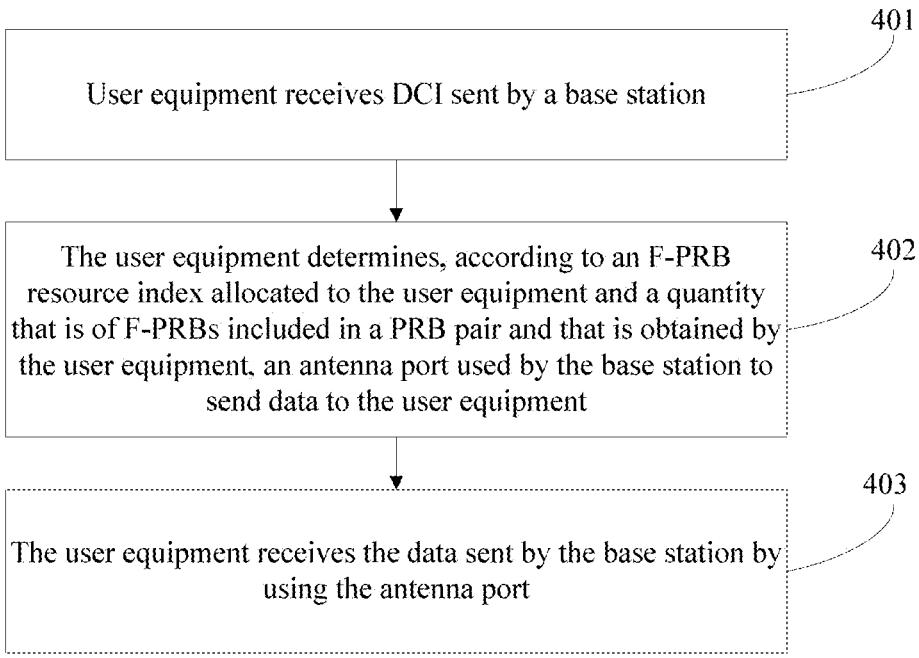
FIG. 4 is a schematic flowchart of a data transmission method according to an embodiment of the present invention.

FIG. 4 is a schematic flowchart of a data transmission method according to an embodiment of the present invention. The method may be applied to a scenario in which a transmission format of downlink control information DCI used by a base station is DCI 1A. Referring to FIG. 4, the method includes the following steps.

401. User equipment receives downlink control information DCI sent by the base station, where a transmission format of the DCI is DCI 1A, and the DCI carries a fractional physical resource block F-PRB resource index that is allocated to the user equipment.

402. The user equipment determines, according to the F-PRB resource index allocated to the user equipment and a quantity that is of F-PRBs included in a PRB pair and that is obtained by the user equipment, an antenna port used by the base station to send data to the user equipment.

403. The user equipment receives the data sent by the base station by using the antenna port.

According to the method provided in this embodiment of the present invention, on a user equipment side, the user equipment determines, according to an F-PRB resource index carried in received DCI, an antenna port used to send data to the user equipment, so that the user equipment can learn the antenna port and an F-PRB resource that are used by a base station to send data, and perform data reception. The user equipment can use the F-PRB to receive data sent by the base station. Because the F-PRB resource is smaller than an existing minimum transmission resource block PRB pair resource, when an entire resource block is not required for a transport block, transmission resource utilization is greatly improved, and a waste of transmission resources is avoided. Therefore, a more appropriate transmission resource utilization manner is provided.

Optionally, the determining, by the user equipment according to the F-PRB resource index allocated to the user equipment and a quantity of F-PRBs included in a PRB pair, an antenna port used by the base station for data transmission includes: determining an antenna port index according to the F-PRB resource index allocated to the user equipment and the quantity of the F-PRBs included in the PRB pair; and determining, according to the antenna port index, the antenna port used by the base station to send data to the user equipment.

Optionally, the determining an antenna port index according to the F-PRB resource index allocated to the user equipment and the quantity of the F-PRBs included in the PRB pair is specifically: using, as the antenna port index, a remainder that is obtained by dividing the F-PRB resource index allocated to the user equipment by the quantity of the F-PRBs included in the PRB pair.

That is, the antenna port index may be obtained through calculation by using a predetermined formula, and then the antenna port used to send data to the user equipment is determined according to a preset correspondence between an antenna port index and an antenna port (for example, by using a table capable of reflecting the correspondence).

Figure 5:
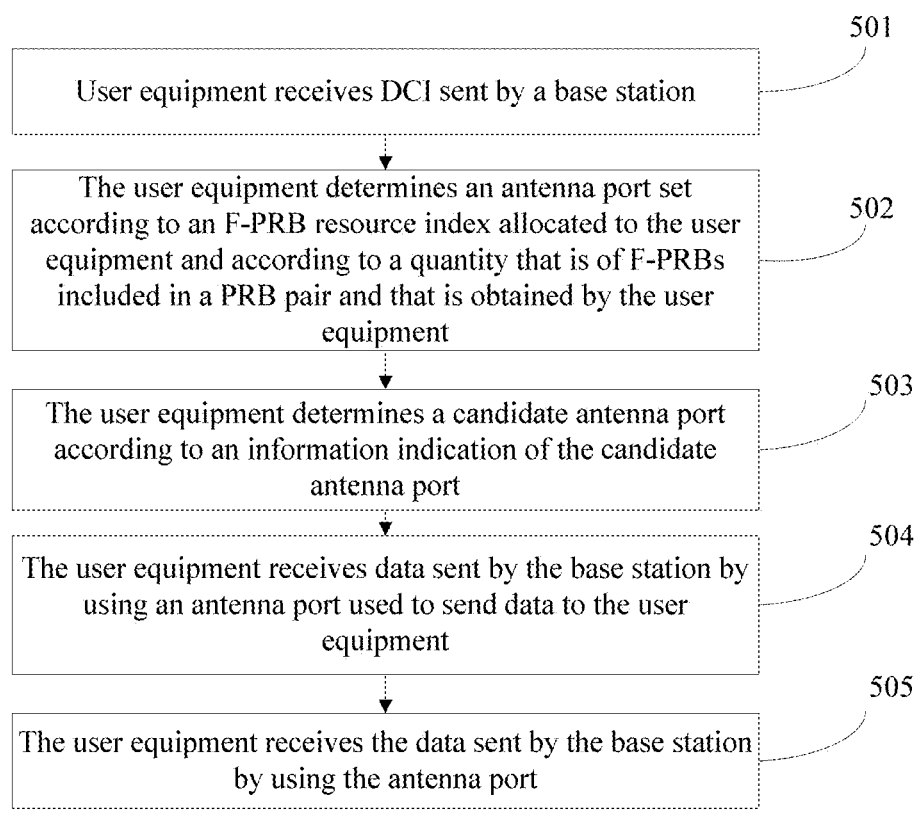
FIG. 5 is a schematic flowchart of a data transmission method according to an embodiment of the present invention.

FIG. 5 is a schematic flowchart of a data transmission method according to an embodiment of the present invention. The method may be applied to a scenario in which a transmission format of downlink control information DCI used by a base station is DCI 2C or DCI 2D. Referring to FIG. 5, the method includes the following steps.

501. User equipment receives downlink control information DCI sent by the base station, where a transmission format of the DCI is DCI 2C or DCI 2D, and the DCI carries an information indication of a candidate antenna port and a fractional physical resource block F-PRB resource index that is allocated to the user equipment.

502. The user equipment determines an antenna port set according to the F-PRB resource index allocated to the user equipment and according to a quantity that is of F-PRBs included in a PRB pair and that is obtained by the user equipment.

503. The user equipment determines a candidate antenna port according to the information indication of the candidate antenna port.

504. The user equipment receives data sent by the base station by using the antenna port used to send data to the user equipment.

It should be noted that in steps 503 and 504, the user equipment may obtain, by using the information indication of the candidate antenna port, the candidate antenna port in a manner of querying a predetermined correspondence (for example, by using a table capable of reflecting the correspondence); and according to the antenna port set determined in step 502, use an antenna port obtained in a manner of calculating an intersection set or the like as the antenna port used by the base station to send data, where the antenna port is a common antenna port between the determined antenna port set and an antenna port that may be used to send data. The process of calculating an intersection set is not limited herein.

505. The user equipment receives the data sent by the base station by using the antenna port.

According to the method provided in this embodiment of the present invention, on a user equipment side, the user equipment determines an antenna port set according to an F-PRB resource index carried in received DCI and according to a quantity of F-PRBs included in a PRB pair; determines, from the antenna port set, an antenna port used to send data to the user equipment; and determines, according to a value of a designated information bit in the DCI, an antenna port that may be used by a base station to send data.

Finally, the user equipment can learn the antenna port used by the base station to send data. Therefore, the user equipment can receive data sent by the base station by reusing a same F-PRB. Compared with the embodiment in FIG. 4 of the present invention, in this embodiment, transmission resource utilization is further improved, and a waste of transmission resources is avoided. Therefore, a more appropriate transmission resource utilization manner is provided.

Optionally, the determining, by the user equipment, an antenna port set according to the F-PRB resource index allocated to the user equipment and according to a quantity of F-PRBs included in a PRB pair is specifically: determining an antenna port index according to the F-PRB resource index allocated to the user equipment and the quantity of the F-PRBs included in the PRB pair; and determining the antenna port set according to the antenna port index.

Optionally, the determining an antenna port index according to the F-PRB resource index allocated to the user equipment and the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing the F-PRB resource index compliant with the selection rule by the quantity of the F-PRBs included in the PRB pair.

Optionally, the determining, by the user equipment, an antenna port index according to the F-PRB resource index allocated to the user equipment and the quantity of the F-PRBs included in the PRB pair is specifically: selecting, from the F-PRB resource index allocated to the user equipment, an F-PRB resource index compliant with a selection rule, where both the base station and the user equipment comply with the selection rule; and using, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

That is, the antenna port index may be obtained through calculation by using different predetermined formulas, and then the antenna port set used to send data to the user equipment is determined according to a preset correspondence between an antenna port index and an antenna port (for example, by using a table capable of reflecting the correspondence).

Optionally, the F-PRB resource index compliant with the selection rule is a smallest F-PRB resource index in the F-PRB resource index allocated to the user equipment.

Optionally, when the quantity of the F-PRBs included in the PRB pair is 2, the user equipment further determines the candidate antenna port according to a transmission frame structure.

Optionally, the information indication of the candidate antenna port is carried by using the antenna port, a scrambling identity, and a layer quantity indication.

Figure 6:
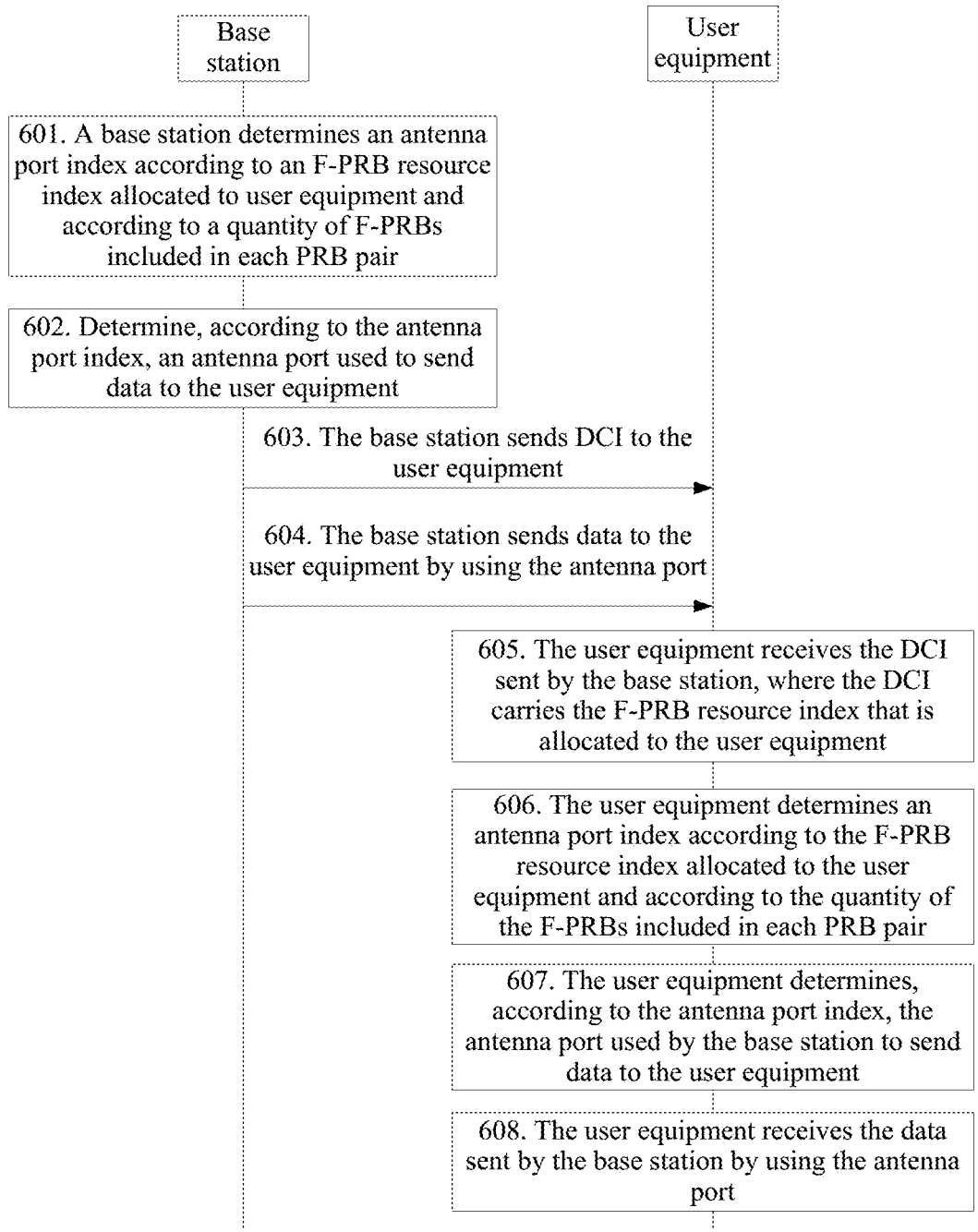
FIG. 6 is an interaction flowchart of a data transmission method according to an embodiment of the present invention.

FIG. 6 is an interaction flowchart of a data transmission method according to an embodiment of the present invention. Referring to FIG. 6, the interaction process involves a base station and user equipment. A scenario in which a transmission format of downlink control information DCI used by the base station is DCI 1A is used as an example for description. The method includes the following steps.

601. The base station determines an antenna port index according to an F-PRB resource index allocated to the user equipment and according to a quantity of F-PRBs included in each PRB pair.

The base station may perform allocation according to a current occupation status of an F-PRB. For example, when there is an idle F-PRB resource, the base station may allocate the idle F-PRB resource to the user equipment. This is not limited in this embodiment of the present invention herein.

Specifically, a remainder that is obtained by dividing the F-PRB resource index by the quantity of the F-PRBs included in each PRB pair is used as the antenna port index.

For ease of intuitively illustrating the calculation process, reference may be made to formula 1 provided as follows:
Formula 1: $n' = n_{F\text{-}PRB,\ low} \bmod N_{F\text{-}PRB}^{RB}$, where
$n_{F\text{-}PRB,low}$ is a smallest F-PRB resource index allocated to the user equipment; and
$N_{F\text{-}PRB}^{RB}$ represents a quantity of the F-PRBs included in each PRB pair, and n' is an antenna port index.

602. Determine, according to the antenna port index, an antenna port used to send data to the user equipment.

The determining process may include: The base station queries, according to the antenna port index, a preset correspondence between an antenna port index and an antenna port, to obtain the antenna port used to send data to the user equipment. For example, the correspondence may be shown in Table 1 as follows:

TABLE 1

| Antenna port index n' | Antenna port (in a ¼ F-PRB scenario) | Antenna port (in a ½ F-PRB scenario) |
|---|---|---|
| 0 | 7 | 7 |
| 1 | 8 | 8 |
| 2 | 9 | None |
| 3 | 6 | None |

Based on Table 1, an example in which the antenna port index is 0 and currently each PRB pair includes four F-PRBs is used for description. By means of querying the table, it can be learnt that the base station may use an antenna port 7 to send data to the user equipment.

Steps 601 and 602 are a process in which the base station determines, according to the fractional physical resource block F-PRB resource index allocated to the user equipment and the quantity of the F-PRBs included in each PRB pair, the antenna port used to send data to the user equipment.

603. The base station sends DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and the quantity that is of the F-PRBs included in each PRB pair and that is obtained by the user equipment.

604. The base station sends the data to the user equipment by using the antenna port.

605. The user equipment receives the DCI sent by the base station, where the DCI carries the F-PRB resource index that is allocated to the user equipment.

606. The user equipment determines an antenna port index according to the F-PRB resource index allocated to the user equipment and the quantity of the F-PRBs included in each PRB pair.

A process of determining an antenna port index is similar to the process of determining an antenna port index on the base station side. The calculation process using formula 1 may be used in the two processes. For details, reference may be made to step 601, and details are not described herein again in this embodiment of the present invention.

607. The user equipment determines, according to the antenna port index, the antenna port used by the base station to send data to the user equipment.

It should be noted that the process of determining the antenna port according to the antenna port index is similar to the process of determining an antenna port according to the antenna port index on the base station side. The manner of querying may be used in the two processes, and a relationship between an antenna port index and an antenna port needs to be the same as that in step 602. For details, reference may be made to step 602, and details are not described herein again in this embodiment of the present invention. The preset correspondence between an antenna port index and an antenna port may be set by the base station in advance and may be synchronized to the user equipment in a broadcasting or configuration manner. This is not limited in this embodiment of the present invention.

Steps 606 to 607 are a process in which the user equipment determines, according to the F-PRB resource index allocated to the user equipment, the antenna port used by the base station to send data.

608. The user equipment receives the data sent by the base station by using the antenna port.

It should be noted that in the foregoing steps, an example in which the base station directly performs data transmission after delivering the DCI is used for description. However, in an actual scenario, after the base station delivers the DCI, the user equipment may first determine, according to the received DCI, the antenna port used by the base station to send data; and then the base station continues with data transmission. A specific sequence of the foregoing steps is not limited in the present invention.

According to the method provided in this embodiment of the present invention, a base station determines, according to an F-PRB resource index allocated to user equipment and according to a quantity of F-PRBs included in each PRB pair, an antenna port used to send data to the user equipment; and the base station sends DCI to the user equipment, where the DCI carries the F-PRB resource index that is allocated to the user equipment, so that the user equipment can learn the antenna port and an F-PRB resource that are used by the base station to send data, and perform data reception. In this way, the user equipment can use the F-PRB resource to receive data sent by the base station. Because the F-PRB resource is smaller than an existing minimum transmission resource block PRB pair resource, when an entire resource block is not required for a transport block, transmission resource utilization is greatly improved, and a waste of transmission resources is avoided. Therefore, a more appropriate transmission resource utilization manner is provided.

Figure 7:
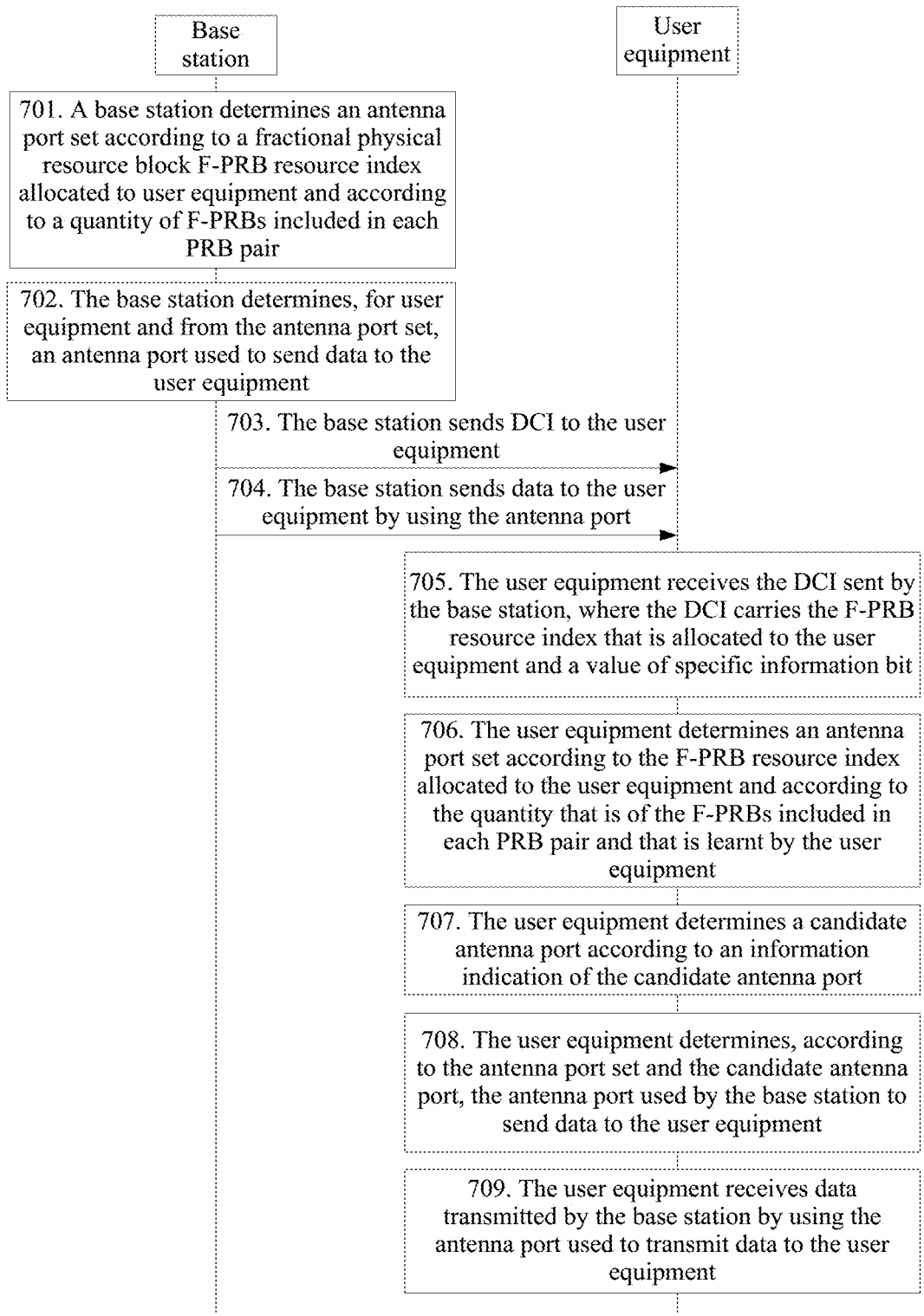
FIG. 7 is an interaction flowchart of a data transmission method according to an embodiment of the present invention.

FIG. 7 is an interaction flowchart of a data transmission method according to an embodiment of the present invention. Referring to FIG. 7, the interaction process involves a base station and user equipment. A scenario in which a transmission format of downlink control information DCI used by the base station is DCI 2C or DCI 2D is used as an example for description. The method includes the following steps.

701. The base station determines an antenna port set according to a fractional physical resource block F-PRB resource index allocated to the user equipment and according to a quantity of F-PRBs included in each PRB pair.

The antenna port set may be a set including multiple antenna ports. This is not limited in this embodiment of the present invention.

Specifically, an antenna port index is determined according to the F-PRB resource index allocated to the user equipment and the quantity of the F-PRBs included in each PRB pair; and the antenna port set is determined according to the antenna port index.

The determining an antenna port index according to the F-PRB resource index allocated to the user equipment and according to the quantity of the F-PRBs included in each PRB pair may specifically be either case of the following steps 701a and 701b:

701a. Select, from the F-PRB resource index allocated to the user equipment, an F-PRB resource index compliant with a selection rule, where both the base station and the user equipment comply with the selection rule; and use, as the antenna port index, a remainder that is obtained by dividing the F-PRB resource index compliant with the selection rule by the quantity of the F-PRBs included in each PRB pair.

It should be noted that in step 701a, formula 1 provided in step 1001 may be used for calculation to obtain the antenna port index. Details about a specific process thereof are not described herein again.

701b. Select, from the F-PRB resource index allocated to the user equipment, an F-PRB resource index compliant with a selection rule, where both the base station and the user equipment comply with the selection rule; and use, as the antenna port index, a remainder that is obtained by dividing a value by the quantity of the F-PRBs included in each PRB pair, where the value is obtained by adding the F-PRB resource index compliant with the selection rule and a radio network temporary identifier of the user equipment.

For ease of intuitively illustrating the calculation process, reference may be made to formula 2 provided as follows:

$$n' = (n_{F\text{-}PRB,low} + n_{RNTI}) \bmod N_{F\text{-}PRB}^{RB}, \text{ where} \quad \text{Formula 2:}$$

$n_{F\text{-}PRB,low}$ is a smallest F-PRB resource index allocated to the user equipment;

$n_{RNTI}$ is a radio network temporary identifier (RNTI) of the user equipment;

$N_{F\text{-}PRB}^{RB}$ represents a quantity of the F-PRBs included in each PRB pair; and n' is an antenna port index.

It should be noted that in formula 1 and formula 2 in the foregoing embodiments, an example in which only the F-PRB resource index compliant with the selection rule is the smallest F-PRB resource index in the F-PRB resource index allocated to the user equipment is used for description. In an actual scenario, the rule may be pre-agreed in a protocol used for data transmission between the base station and the user equipment, without being limited to the smallest F-PRB resource index. For example, it may be also agreed that the F-PRB resource index compliant with the selection rule is a largest F-PRB resource index. This is not limited in this embodiment of the present invention.

The process of "determining the antenna port set according to the antenna port index" may include: The base station queries, according to the antenna port index, a preset correspondence between an antenna port index and an antenna port, to obtain the antenna port used to send data to the user equipment. In the correspondence, one antenna port index may be corresponding to multiple antenna ports. For example, the correspondence may be shown in Table 2 as follows:

TABLE 2

| Antenna port index n' | Antenna port set (in a ¼ F-PRB scenario) | Antenna port set (in a ½ F-PRB scenario) |
|---|---|---|
| 0 | 7, 11 | 7, 9, 11, 13 |
| 1 | 8, 12 | 8, 10, 12, 14 |
| 2 | 9, 13 | None |
| 3 | 10, 14 | None |

Based on Table 2, that the antenna port index is 0 and currently each PRB pair includes four F-PRBs is used as an example. By means of querying the table, it can be learnt that, when n' is 0, a determined antenna port set is (7, 11).

An example in which the antenna port index is still 0 and currently each PRB pair includes two F-PRBs is used for description. By means of querying the table, it can be learnt that, when n' is 0, a determined antenna port set is (7, 9, 11, 13).

702. The base station determines, for the user equipment and from the antenna port set, an antenna port used to send data to the user equipment.

It should be noted that the base station may randomly select at least one antenna port from the antenna port set determined in step 701, and allocate the at least one antenna port to the user equipment. Alternatively, the base station may allocate, according to an occupation status of current antenna ports, an antenna port with a lower usage in the antenna port set to the user equipment. The allocation manner is not specifically limited in this embodiment of the present invention.

That the antenna port index is 0 and currently each PRB pair includes four F-PRBs is used as an example. By means of querying Table 2, it can be learnt that, when n' is 0, a determined antenna port set is (7, 11). In this case, the base station may determine an antenna port 7 as the antenna port used to send data to the user equipment.

It should be noted that, after the base station selects the antenna port used to send data to the user equipment, a sending layer quantity of the base station is determined accordingly. For example, if the base station selects one antenna port, the sending layer quantity is 1; and if the base station selects two antenna ports, the sending layer quantity is 2, and so on.

703. The base station sends DCI to the user equipment, where the DCI carries the F-PRB resource index allocated to the user equipment and an information indication of a candidate antenna port, and the information indication of the candidate antenna port is determined according to the antenna port used to send data to the user equipment.

Preferably, the information indication of the candidate antenna port is carried by using the antenna port, a scrambling identity, and a layer quantity indication. In this embodiment of the present invention, the information indication of the candidate antenna port may be used to notify the user equipment of a candidate antenna port that is used by the base station to send data on an F-PRB resource, that is, an antenna port that may be used.

Further, the base station may further determine the scrambling identity of the user equipment, to differentiate the user equipment from another user equipment. In this case, the information indication of the candidate antenna port is further determined according to the scrambling identity. It should be noted that the scrambling identity may be represented by using a scrambling identity index nSCID.

Optionally, before sending the DCI, the base station needs to determine the information indication of the candidate antenna port. The determining process may include: The base station queries, according to the antenna port selected for the user equipment and the scrambling identity, a correspondence between a value and information that indicates the antenna port, the scrambling identity of the antenna port, and a sending layer quantity indication, to obtain the information indication of the candidate antenna port carried in the DCI. For example, when each PRB pair is divided into four F-PRBs, the correspondence may be represented in a tabular form, as shown in Table 3 as follows:

TABLE 3

¼ F-PRB scenario

| An information indication of a candidate antenna port (Value) | Information that indicates a scrambling identity, an antenna port, and a sending layer quantity indication (Message) |
|---|---|
| 0 | Layer 1, antenna port 7, 8, 9, or 10, and $n_{SCID} = 0$ |
| 1 | Layer 1, antenna port 7, 8, 9, or 10, and $n_{SCID} = 1$ |
| 2 | Layer 1, antenna port 11, 12, 13, or 14, and $n_{SCID} = 0$ |
| 3 | Layer 1, antenna port 11, 12, 13, or 14, and $n_{SCID} = 1$ |
| 4 | Layer 2 and $n_{SCID} = 0$ |
| 5 | Layer 2 and $n_{SCID} = 1$ |
| 6 | Reserved |
| 7 | Reserved |

That the antenna port index is 0 and currently each PRB pair includes four F-PRBs is still used as an example for description. By means of querying Table 2, it can be learnt that, when n' is 0, a determined antenna port set is (7, 11). In this case, the base station may determine an antenna port 7 as the antenna port used to send data to the user equipment. If the scrambling identity index nSCID=0, by means of querying Table 3, it can be learnt that a value of an indication information bit in the DCI is 0. In this case, if the antenna port allocated by the base station is 7, and nSCID=0, a value of the information indication of the candidate antenna port is 2.

Further, when the quantity of the F-PRBs included in each PRB pair is 2, the base station can further use an extended cyclic prefix (extended CP, extended Cyclic Prefix) frame structure to perform data transmission. However, the extended CP supports data transmission performed by using two antenna ports at maximum. Therefore, optionally, in this case, a relationship between the information indication of the candidate antenna port, and the antenna port used to send data to the user equipment and a layer quantity is different from, when a normal cyclic prefix (normal CP) frame structure is used, a relationship between the information indication of the candidate antenna port, and the antenna port used to send data to the user equipment and a layer quantity. Therefore, the information indication of the candidate antenna port may be further determined according to a transmission frame structure.

For example, in a case of the normal CP, a correspondence between the value and information that indicates an antenna port, a scrambling identity of the antenna port, and a sending layer quantity indication may be represented in a tabular form, as shown in Table 4 as follows:

TABLE 4

In a ½ F-PRB scenario, when a normal CP is used

| An information indication of a candidate antenna port, Value | Information that indicates a scrambling identity, an antenna port, and a sending layer quantity indication, Message |
|---|---|
| 0 | Layer 1 and antenna port 7 or 8 |
| 1 | Layer 1 and antenna port 9 or 10 |
| 2 | Layer 1 and antenna port 11 or 12 |
| 3 | Layer 1 and antenna port 13 or 14 |
| 4 | Layer 2 and antenna ports 7&9 or 8&10 |
| 5 | Layer 2 and antenna ports 11&13 or 12&14 |
| 6 | Layer 3 and antenna ports 7&9&11 or 8&10&12 |
| 7 | Layer 4 and antenna ports 7&9 &11&13 or 8&10&12&14 |

In a case of the normal CP, an example in which the antenna port index is 0 is used for description. By means of querying Table 2, it can be learnt that an antenna port 7, 9, 11, or 13 may be used to receive data from the user equipment. In this case, if the base station selects an antenna port 7, by means of querying Table 3, it can be learnt that a value of an indication information bit in the DCI is 0. In this case, if the base station selects antenna ports 7 and 9 (where a sending layer quantity is 2), and a scrambling identity is set to a default value, a value of the information indication of the candidate antenna port is 4.

In a case of the extended CP, a correspondence between the value and information that indicates an antenna port, a scrambling identity of the antenna port, and a sending layer quantity indication may be represented in a tabular form, as shown in Table 5 as follows:

TABLE 5

In a ½ F-PRB scenario, when an extended CP is used

| A value of an information indication of a candidate antenna port, Value | Information that indicates a scrambling identity, an antenna port, and a sending layer quantity indication, Message |
|---|---|
| 0 | Layer 1, antenna port 7 or 8, and $n_{SCID} = 0$ |
| 1 | Layer 1, antenna port 7 or 8, and $n_{SCID} = 1$ |
| 2 | Reserved |
| 3 | Reserved |
| 4 | Reserved |
| 5 | Reserved |
| 6 | Reserved |
| 7 | Reserved |

In a case of the extended CP, that the antenna port index is 0 is used as an example. By means of querying Table 2, it can be learnt that an antenna port 7, 9, 11, or 13 may be used to receive data from the user equipment. In this case, if the base station selects the antenna port 7, and nSCID=0, by means of querying Table 5, it can be learnt that a value of an indication information bit in the DCI is 0.

Certainly, in Table 4 and Table 5, an example in which different correspondences between a value and information that indicates an antenna port, a scrambling identity of the antenna port, and a sending layer quantity indication are used in cases of different transmission frame formats is used for description. In an actual scenario, it may be implemented that a same correspondence is used in cases of different transmission frame formats. For example, a correspondence between the value and information that indicates an antenna port, a scrambling identity of the antenna port, and a sending layer quantity indication may be represented in a tabular form, as shown in Table 6 as follows:

TABLE 6

½ F-PRB scenario

| An information indication of a candidate antenna port, Value | Information that indicates a scrambling identity, an antenna port, and a sending layer quantity indication, Message |
|---|---|
| 0 | Layer 1, antenna port 7 or 8, and $n_{SCID} = 0$ |
| 1 | Layer 1, antenna port 7 or 8, and $n_{SCID} = 1$ |
| 2 | Layer 1, antenna port 9 or 11, and $n_{SCID} = 0$ |
| 3 | Layer 1, antenna port 9 or 11, and $n_{SCID} = 1$ |
| 4 | Layer 2 and antenna ports 7&9 or 8&10 |
| 5 | Layer 2 and antenna ports 11&13 or 12&14 |
| 6 | Layer 3 and antenna ports 7&9&11 or 8&10&12 |
| 7 | Layer 4 and antenna ports 7&9 &11&13 or 8&10&12&14 |

In this case, a same table is used for the two transmission frame structures: the normal CP and the extended CP.

An example in which the antenna port index is 0 is used for description. It can be learnt, according to the antenna port index and the quantity of the F-PRBs, that an antenna port 7, 9, 11, or 13 is available by means of querying Table 2. Then, in this case, if the base station selects the antenna port 7 for use, and nSCID=0, a value of the information indication of the candidate antenna port in the DCI is 0. If the base station selects the antenna port 9 for use, and nSCID=0, a value of the information indication of the candidate antenna port in the DCI is 2.

704. The base station sends the data to the user equipment by using the antenna port.

705. The user equipment receives the DCI sent by the base station, where the DCI carries the F-PRB resource index that is allocated to the user equipment and the information indication of the candidate antenna port.

706. The user equipment determines an antenna port set according to the F-PRB resource index allocated to the user equipment and according to the quantity that is of the F-PRBs included in each PRB pair and that is learnt by the user equipment.

Specifically, the user equipment determines the antenna port set according to the F-PRB resource index allocated to the user equipment and according to the quantity of the F-PRBs included in each PRB pair. Further, the process includes: The user equipment determines an antenna port index according to the F-PRB resource index allocated to the user equipment and according to the quantity of the F-PRBs included in each PRB pair; and determines the antenna port set according to the antenna port index.

The process in which the user equipment determines the antenna port index according to the F-PRB resource index allocated to the user equipment and the quantity of the F-PRBs included in each PRB pair may include either of the following steps 706a and 706b:

706a. The user equipment selects, from the F-PRB resource index allocated to the user equipment, an F-PRB resource index compliant with a selection rule; and uses, as the antenna port index, a reminder that is obtained by dividing the F-PRB resource index compliant with the selection rule by the quantity of the F-PRBs included in each PRB pair.

706b. The user equipment selects, from the F-PRB resource index allocated to the user equipment, an F-PRB resource index compliant with a selection rule; and uses, as the antenna port index, a remainder that is obtained by dividing a value by the quantity of the F-PRBs included in each PRB pair, where the value is obtained by adding the F-PRB resource index compliant with the selection rule and a radio network temporary identifier of the user equipment.

Steps 706a and 706b are similar to the foregoing steps 700a and 701b, and details are not described herein.

It should be noted that in a process of determining the antenna port set, the user equipment may obtain, according to different quantities of F-PRBs included in all the PRB pairs, the antenna port index based on formula 1 or formula 2; and then queries, based on the antenna port index, a correspondence between an antenna port index and an antenna port set for the antenna port set. The correspondence between an antenna port index and an antenna port set should be the same as the correspondence provided in step 701. For example, for the correspondence, reference may be made to Table 2. For a specific table querying means, reference may be made to the foregoing examples. Calculation and querying processes are similar to step 701. Details are not described herein.

707. The user equipment determines a candidate antenna port according to the information indication of the candidate antenna port.

It should be noted that in a process in which the user equipment determines the antenna port that may be used by the base station for to send data, according to different quantities of F-PRBs included in all the PRB pairs, for a table of a correspondence between the information indication of the candidate antenna port and a scrambling identity, an antenna port, and sending layer indication information, reference may be made to Table 3 to Table 6. For a specific table querying means, reference may be made to the foregoing described examples. In the foregoing examples, reverse querying is used as an example for description. The information indication of the candidate antenna port is determined according to an allocated antenna port and allocated nSCID. However, on the user equipment side, according to the information indication of the candidate antenna port in the DCI, information that indicates a scrambling identity, at least one antenna port, and a sending layer quantity indication and that is corresponding to the value is queried in a forward manner, to determine the antenna port that may be used by the base station to send data.

708. The user equipment determines, according to the antenna port set and the candidate antenna port, an antenna port used by the base station to send data to the user equipment.

It should be noted that the determining an antenna port used by the base station to send data may be a process of calculating an intersection set. That is, a common antenna port in the determined antenna port set and the antenna port that may be used to send data is used as the antenna port used by the base station to send data. Herein, the process of calculating the intersection set is not limited herein. For example, in a ¼ F-PRB scenario, if an antenna port index is 0, a determined antenna port set is (7, 11); and if an information indication of a candidate antenna port in DCI is 0, it can be learnt, by means of querying Table 3, that an antenna port 7, 8, 9, or 10 may be used to send data. Then, it can be learnt, by means of calculating an intersection set, that the base station currently uses the antenna port 7 to send data.

709. The user equipment receives data sent by the base station by using the antenna port used to send data to the user equipment.

It should be noted that in the foregoing steps, an example in which the base station directly performs data transmission after delivering the DCI is used for description. However, in an actual scenario, after the base station delivers the DCI, the user equipment may first determine, according to the received DCI, the antenna port used by the base station to send data; and then the base station continues with data transmission. A specific sequence of the foregoing steps is not limited in the present invention.

According to the method provided in this embodiment of the present invention, a base station determines, according to an F-PRB resource index allocated to user equipment and a quantity of F-PRBs included in each physical resource block PRB, an antenna port used to send data to the user equipment; and the base station sends DCI to the user equipment, where the DCI carries the F-PRB resource index that is allocated to the user equipment, so that the user equipment can learn the antenna port and an F-PRB resource that are used by the base station to send data, and perform data reception. In this way, different user equipments can receive, on a same F-PRB, data sent by the base station by using different antenna ports. Therefore, the base station can use different antenna ports to send data to the different user equipments. This greatly improves transmission resource utilization, avoids a waste of transmission resources. Therefore, a more appropriate transmission resource utilization manner is provided.

Figure 8:
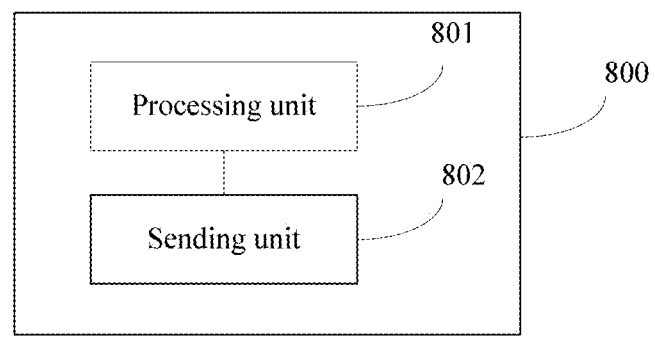
FIG. 8 is a schematic structural diagram of a base station according to an embodiment of the present invention.

FIG. 8 is a schematic structural diagram of a base station according to an embodiment of the present invention. Referring to FIG. 8, the base station 800 includes: a processing unit 801, configured to determine, according to a fractional physical resource block F-PRB resource index allocated to user equipment and a quantity of F-PRBs included in a physical resource block PRB, an antenna port used to send data to the user equipment; and a sending unit 802, configured to send DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and according to the quantity that is of the F-PRBs included in the PRB pair and that is obtained by the user equipment.

The sending unit is further configured to send the data to the user equipment by using the antenna port.

Optionally, the processing unit 801 is specifically configured to: determine an antenna port index according to the F-PRB resource index allocated to the user equipment and the quantity of the F-PRBs included in the PRB pair; and determine, according to the antenna port index, the antenna port used to send data to the user equipment.

The processing unit 801 is configured to use, as the antenna port index, a remainder that is obtained by dividing the F-PRB resource index allocated to the user equipment by the quantity of the F-PRBs included in the PRB pair.

It should be noted that the base station 800 provided in this embodiment can implement the method embodiments that can be implemented by the base station in the embodiments in FIG. 2 and FIG. 6. For specific steps, reference may be made to the embodiments in FIG. 2 and FIG. 6, and details are not described herein again.

Figure 9:
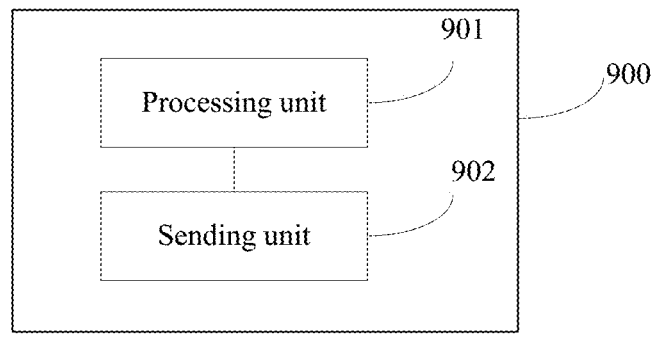
FIG. 9 is a schematic structural diagram of a base station according to an embodiment of the present invention.

FIG. 9 is a schematic structural diagram of a base station according to an embodiment of the present invention. Referring to FIG. 9, the base station includes: a processing unit 901, configured to determine an antenna port set according to a fractional physical resource block F-PRB resource index allocated to user equipment and according to a quantity of F-PRBs included in a physical resource block PRB, where the processing unit is further configured to determine, from the antenna port set, an antenna port used to send data to the user equipment; and a sending unit 902, configured to send DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment, where the sending unit 902 is further configured to send the data to the user equipment by using the antenna port.

Optionally, the processing unit 901 is further configured to determine a scrambling identity of the user equipment. The information indication of the candidate antenna port is further determined according to the scrambling identity.

Optionally, the processing unit 901 is specifically configured to: determine an antenna port index according to the F-PRB resource index allocated to the user equipment and according to the quantity of the F-PRBs included in the PRB pair; and determine the antenna port set according to the antenna port index.

Optionally, the processing unit 901 is specifically configured to: select, from the F-PRB resource index allocated to the user equipment, an F-PRB resource index compliant with a selection rule, where both the base station and the user equipment comply with the selection rule; and use, as the antenna port index, a remainder that is obtained by dividing the F-PRB resource index compliant with the selection rule by the quantity of the F-PRBs included in the PRB pair.

Optionally, the processing unit 901 is specifically configured to: select, from the F-PRB resource index allocated to the user equipment, an F-PRB resource index compliant with a selection rule, where both the base station and the user equipment comply with the selection rule; and use, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

Optionally, the F-PRB resource index compliant with the selection rule is a smallest F-PRB resource index in the F-PRB resource index allocated to the user equipment.

Optionally, when the quantity of the F-PRBs included in the PRB pair is 2, the information indication of the candidate antenna port is further determined according to a transmission frame structure.

Optionally, the information indication of the candidate antenna port is carried by using the antenna port, the scrambling identity, and a layer quantity indication.

It should be noted that the base station 900 provided in this embodiment can implement the method embodiments that can be implemented by the base station in the embodiments in FIG. 3 and FIG. 7. For specific steps, reference may be made to the embodiments in FIG. 3 and FIG. 7, and details are not described herein again.

Figure 10:
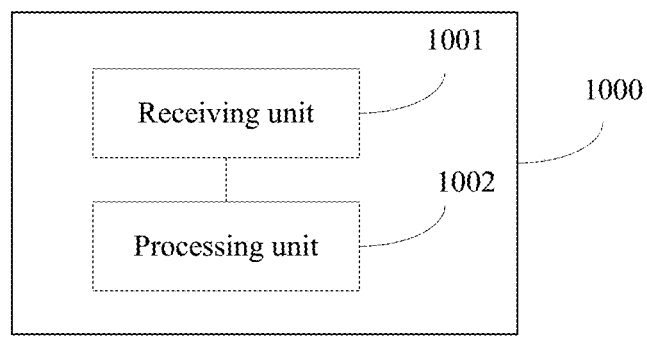
FIG. 10 is a schematic structural diagram of user equipment according to an embodiment of the present invention.

FIG. 10 is a schematic structural diagram of user equipment according to an embodiment of the present invention. Referring to FIG. 10, the user equipment includes a receiving unit 1001, configured to receive DCI sent by a base station, where a transmission format of the DCI is DCI 1A, and the DCI carries an F-PRB resource index that is allocated to the user equipment. The user equipment also includes a processing unit 1002, configured to determine, according to the F-PRB resource index allocated to the user equipment and a quantity of F-PRBs included in a PRB pair, an antenna port used by the base station to send data to the user equipment.

The receiving unit 1001 is further configured to receive data sent by the base station by using the antenna port.

Optionally, the processing unit 1002 is configured to: determine an antenna port index according to the F-PRB resource index allocated to the user equipment and the quantity of the F-PRBs included in the PRB pair; and determine, according to the antenna port index, the antenna port used by the base station to send data to the user equipment.

Optionally, the processing unit 1002 is configured to use, as the antenna port index, a remainder that is obtained by dividing the F-PRB resource index allocated to the user equipment by the quantity of the F-PRBs included in the PRB pair.

It should be noted that the user equipment 1000 provided in this embodiment can implement the method embodiments that can be implemented by the user equipment in the embodiments in FIG. 4 and FIG. 6. For specific steps, reference may be made to the embodiments in FIG. 4 and FIG. 6, and details are not described herein again.

Figure 11:
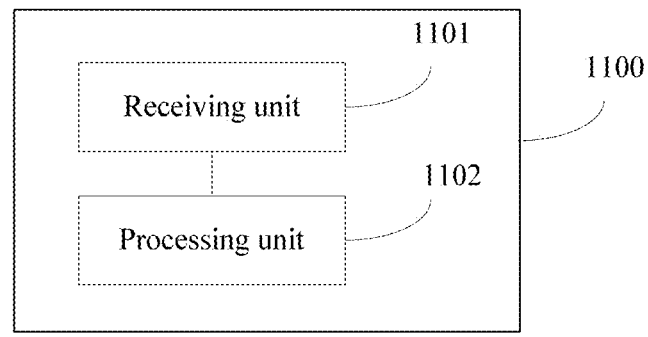
FIG. 11 is a schematic structural diagram of user equipment according to an embodiment of the present invention.

FIG. 11 is a schematic structural diagram of user equipment according to an embodiment of the present invention. Referring to FIG. 11, the user equipment includes: a receiving unit 1101, configured to receive DCI sent by a base station, where a transmission format of the DCI is DCI 2C or DCI 2D, and the DCI carries an F-PRB resource index that is allocated to the user equipment and an information indication of a candidate antenna port; and a processing unit 1102, configured to determine an antenna port set according to the F-PRB resource index allocated to the user equipment and according to a quantity that is of F-PRBs included in each PRB pair and that is obtained by the user equipment.

The processing unit 1102 is further configured to determine a candidate antenna port according to a value of the information indication of the candidate antenna port.

The processing unit 1102 is further configured to determine, according to the antenna port set and the candidate antenna port, an antenna port used by the base station to send data to the user equipment.

The receiving unit 1101 is further configured to receive data sent by the base station by using the antenna port used to send data to the user equipment.

Optionally, the processing unit 1102 is configured to: determine an antenna port index according to the F-PRB resource index allocated to the user equipment and according to the quantity of the F-PRBs included in the PRB pair; and determine the antenna port set according to the antenna port index.

Optionally, the processing unit 1102 is configured to: select, from the F-PRB resource index allocated to the user equipment, an F-PRB resource index compliant with a selection rule, where both the base station and the user equipment comply with the selection rule; and use, as the antenna port index, a remainder that is obtained by dividing the F-PRB resource index compliant with the selection rule by the quantity of the F-PRBs included in the PRB pair.

Optionally, the processing unit 1102 is configured to: select, from the F-PRB resource index allocated to the user equipment, an F-PRB resource index compliant with a selection rule, where both the base station and the user equipment comply with the selection rule; and use, as the antenna port index, a remainder that is obtained by dividing a value by the quantity of the F-PRBs included in the PRB pair, where the value is obtained by adding the F-PRB resource index compliant with the selection rule and a radio network temporary identifier of the user equipment.

Optionally, the F-PRB resource index compliant with the selection rule is a smallest F-PRB resource index in the F-PRB resource index allocated to the user equipment.

Optionally, when the quantity of the F-PRBs included in the PRB pair is 2, the processing unit is further configured to determine the candidate antenna port according to a transmission frame structure.

Optionally, the information indication of the candidate antenna port is carried by using the antenna port, a scrambling identity, and a layer quantity indication.

It should be noted that the user equipment 1100 provided in this embodiment can implement the method embodiments that can be implemented by the user equipment in the embodiments in FIG. 5 and FIG. 7. For specific steps, reference may be made to the embodiments in FIG. 5 and FIG. 7, and details are not described herein again.

Figure 12:
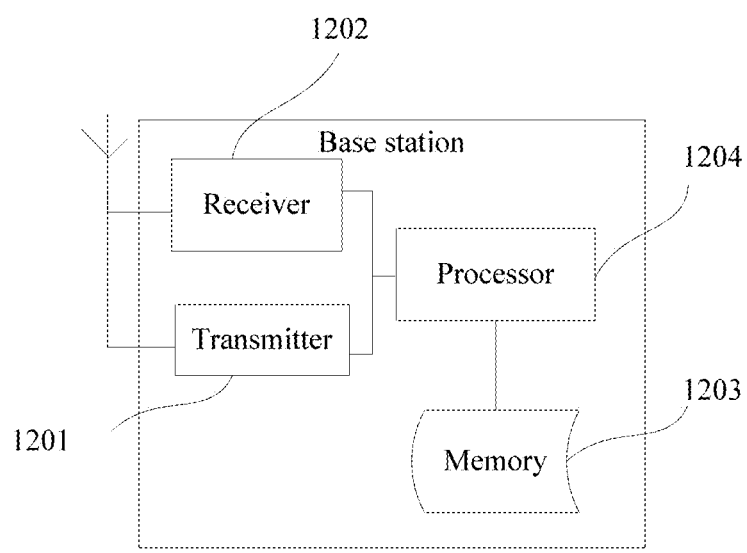
FIG. 12 is a schematic structural diagram of a base station according to an embodiment of the present invention.

FIG. 12 is a schematic structural diagram of a base station according to an embodiment of the present invention. Referring to FIG. 12, the base station includes: a transmitter 1201, a receiver 1202, a memory 1203, and a processor 1204 connected to the transmitter 1201, the receiver 1202, and the memory 1203. Certainly, the base station may further include a general-purpose component, such as an antenna, a baseband processing component, an intermediate radio frequency processing component, and an input/output apparatus. This is not limited in this embodiment of the present invention herein.

The memory 1203 stores a group of program code, and the processor 1204 is configured to call the program code stored in the memory 1203, to perform the following operations: determining, according to a fractional physical resource block F-PRB resource index allocated to user equipment and a quantity of F-PRBs included in a physical resource block PRB, an antenna port used to send data to the user equipment; sending DCI to the user equipment, where a transmission format of the DCI is DCI 1A, and the DCI carries the F-PRB resource index that is allocated to the user equipment, so that the user equipment determines the antenna port according to the F-PRB resource index allocated to the user equipment and the quantity that is of the F-PRBs included in the PRB pair and that is obtained by the user equipment; and sending the data to the user equipment by using the antenna port.

Further, the processor is configured to call the program code stored in the memory, to perform any operation performed by the base station in FIG. 2 and FIG. 6. For detailed operations, reference may be made to the foregoing embodiments, and details are not described herein.

Figure 13:
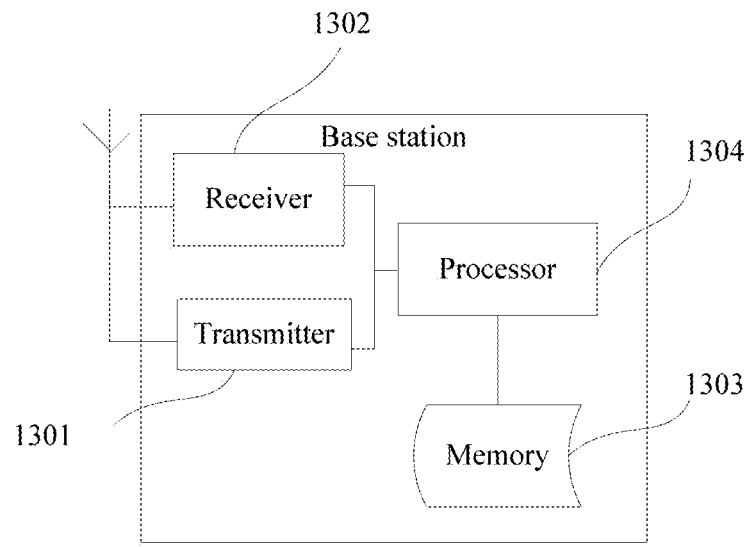
FIG. 13 is a schematic structural diagram of a base station according to an embodiment of the present invention.

FIG. 13 is a schematic structural diagram of a base station according to an embodiment of the present invention. Referring to FIG. 13, the base station includes: a transmitter 1301, a receiver 1302, a memory 1303, and a processor 1304 connected to the transmitter 1301, the receiver 1302, and the memory 1303. Certainly, the base station may further include a general-purpose component, such as an antenna, a baseband processing component, an intermediate radio frequency processing component, and an input/output apparatus. This is not limited in this embodiment of the present invention herein.

The memory 1303 stores a group of program code, and the processor 1304 is configured to call the program code stored in the memory 1303, to perform the following operations: determining an antenna port set according to a fractional physical resource block F-PRB resource index allocated to user equipment and according to a quantity of F-PRBs included in each physical resource block PRB; determining, from the antenna port set, an antenna port used to send data to the user equipment; sending DCI to the user equipment, where a transmission format of the DCI is DCI 2C or DCI 2D, the DCI carries the F-PRB resource index that is allocated to the user equipment and an information indication of a candidate antenna port, and the information indication of the candidate antenna port is determined according to the antenna port used to send data to the user equipment, so that the user equipment determines the antenna port according to the F-PRB resource index allocated to the user equipment, the information indication of the candidate antenna port, and the quantity that is of the F-PRBs included in the PRB pair and that is obtained by the user equipment; and sending the data to the user equipment by using the antenna port.

Further, the processor is configured to call the program code stored in the memory, to perform any operation performed by the base station in FIG. 3 and FIG. 7. For detailed operations, reference may be made to the foregoing embodiments, and details are not described herein.

Figure 14:
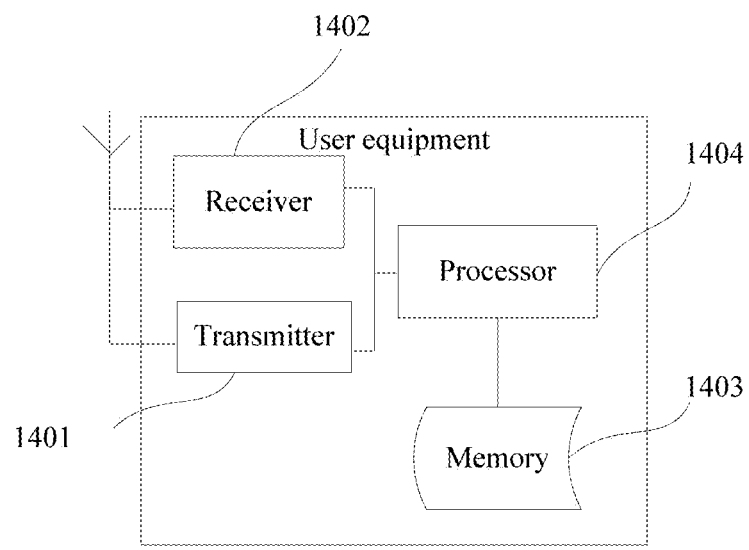
FIG. 14 is a schematic structural diagram of user equipment according to an embodiment of the present invention.

FIG. 14 is a schematic structural diagram of user equipment according to an embodiment of the present invention. Referring to FIG. 14, the user equipment includes: a transmitter 1401, a receiver 1402, a memory 1403, and a processor 1404 connected to the transmitter 1401, the receiver 1402, and the memory 1403. Certainly, the user equipment may further include a general-purpose component, such as an antenna, a baseband processing component, an intermediate radio frequency processing component, and an input/output apparatus. This is not limited in this embodiment of the present invention herein. The memory 1403 stores a group of program code, and the processor 1404 is configured to call the program code stored in the memory 1403, to perform the following operations: receiving DCI sent by a base station, where a transmission format of the DCI is DCI 1A, and the DCI carries an F-PRB resource index that is allocated to the user equipment; determining, according to the F-PRB resource index allocated to the user equipment and according to a quantity that is of F-PRBs included in a PRB pair and that is learnt by the user equipment, an antenna port used by the base station to send data to the user equipment; and receiving data sent by the base station by using the antenna port.

Further, the processor is configured to call the program code stored in the memory, to perform any operation performed by the user equipment in FIG. 4 and FIG. 6. For detailed operations, reference may be made to the foregoing embodiments, and details are not described herein.

Figure 15:
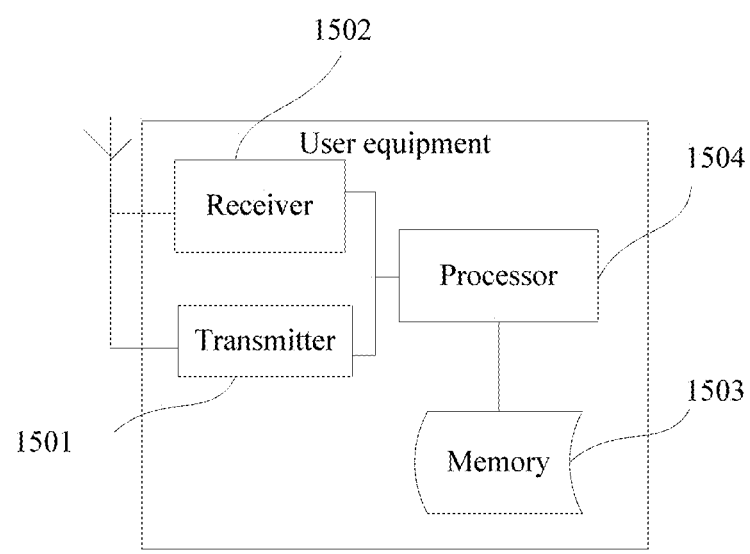
FIG. 15 is a schematic structural diagram of user equipment according to an embodiment of the present invention.

FIG. 15 is a schematic structural diagram of user equipment according to an embodiment of the present invention. Referring to FIG. 15, the user equipment includes: a transmitter 1501, a receiver 1502, a memory 1503, and a processor 1504 connected to the transmitter 1501, the receiver 1502, and the memory 1503. Certainly, the user equipment may further include a general-purpose component, such as an antenna, a baseband processing component, an intermediate radio frequency processing component, and an input/output apparatus. This is not limited in this embodiment of the present invention herein. The memory 1503 stores a group of program code, and the processor 1504 is configured to call the program code stored in the memory 1503, to perform the following operations: receiving DCI sent by a base station, where a transmission format of the DCI is DCI 2C or DCI 2D, and the DCI carries an F-PRB resource index that is allocated to the user equipment and a value of an information indication of a candidate antenna port; determining an antenna port set according to the F-PRB resource index allocated to the user equipment and according to a quantity of F-PRBs included in each PRB pair; determining a candidate antenna port according to the information indication of the candidate antenna port; determining, according to the antenna port set and the candidate antenna port, an antenna port used by the base station to send data to the user equipment; and receiving data sent by the base station by using the antenna port used to send data to the user equipment.

Further, the processor is configured to call the program code stored in the memory, to perform any operation performed by the user equipment in FIG. 5 and FIG. 7. For detailed operations, reference may be made to the foregoing embodiments, and details are not described herein.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A method, comprising:
   determining, by a base station, an antenna port set according to a quantity of fractional physical resource blocks (F-PRBs) comprised in a physical resource block (PRB) pair and according to an F-PRB resource index allocated to a user equipment, wherein the antenna port set includes a plurality of antenna ports, and the F-PRB resource index uniquely identifies a F-PRB resource allocated to the user equipment;
   determining, by the base station from the antenna port set, a first antenna port used to send data to the user equipment;
   sending, by the base station, downlink control information (DCI) to the user equipment, wherein a transmission format of the DCI is DCI 2C or DCI 2D, the DCI carries the F-PRB resource index that is allocated to the user equipment and an indication of a candidate antenna port, and the indication of the candidate antenna port is determined according to the first antenna port used to send data to the user equipment, and wherein sending the DCI to the user equipment causes the user equipment to determine the first antenna port according to the F-PRB resource index allocated to the user equipment, the indication of the candidate antenna port, and the quantity of the F-PRBs comprised in the PRB pair; and
   sending, by the base station, the data to the user equipment using the first antenna port.

2. The method according to claim 1, further comprising:
   determining, by the base station, a scrambling identity of the user equipment, wherein the indication of the candidate antenna port is further determined according to the scrambling identity.

3. The method according to claim 2, wherein the indication of the candidate antenna port is carried using information that indicates the antenna port, the scrambling identity, and a layer quantity indication.

4. The method according to claim 1, wherein determining the antenna port set according to the quantity of F-PRBs comprised in the PRB pair and according to the F-PRB resource index allocated to user equipment comprises:
  determining an antenna port index according to the quantity of the F-PRBs comprised in the PRB pair and the F-PRB resource index allocated to the user equipment; and
  determining the antenna port set according to the antenna port index.

5. The method according to claim 1, wherein, when the quantity of the F-PRBs comprised in the PRB pair is 2, the indication of the candidate antenna port is further determined according to a transmission frame structure.

6. A method, comprising:
  receiving, by user equipment, downlink control information (DCI) sent by a base station, wherein a transmission format of the DCI is DCI 2C or DCI 2D, and the DCI carries an indication of a candidate antenna port and a fractional physical resource block (F-PRB) resource index that is allocated to the user equipment, wherein the F-PRB resource index uniquely identifies a F-PRB resource allocated to the user equipment;
  after receiving the DCI, determining, by the user equipment, an antenna port set according to the F-PRB resource index allocated to the user equipment and according to a quantity of F-PRBs comprised in a PRB pair and that is obtained by the user equipment, wherein the antenna port set includes a plurality of antenna ports;
  determining, by the user equipment, a candidate antenna port from the antenna port set according to the indication of the candidate antenna port;
  determining, by the user equipment, according to the antenna port set and the candidate antenna port, a first antenna port used by the base station to send data to the user equipment; and
  receiving, by the user equipment, data sent by the base station using the first antenna port used to send data to the user equipment.

7. The method according to claim 6, wherein determining the antenna port set according to the F-PRB resource index allocated to the user equipment and according to the quantity of F-PRBs comprised in the PRB pair comprises:
  determining an antenna port index according to the F-PRB resource index allocated to the user equipment and according to the quantity of the F-PRBs comprised in the PRB pair; and
  determining the antenna port set according to the antenna port index.

8. The method according to claim 6, wherein, when the quantity of the F-PRBs comprised in the PRB pair is 2, the user equipment further determines the candidate antenna port according to a transmission frame structure.

9. The method according to claim 6, wherein the indication of the candidate antenna port is carried using information that indicates the first antenna port, a scrambling identity, and a layer quantity indication.

10. A base station, comprising:
  a processor; and
  a non-transitory computer-readable storage medium storing a program to be executed by the processor, the program including instructions for:
    determining an antenna port set according to a quantity of fractional physical resource blocks (F-PRBs) comprised in a physical resource block (PRB) pair and according to an F-PRB resource index, wherein the F-PRB resource index is allocated to each of a plurality of user equipment, and the F-PRB resource index uniquely identifies a F-PRB resource; and
    determining, from the antenna port set, a first antenna port used to send data to a first user equipment, wherein different user equipment of the plurality of user equipment receive data using the same F-PRB resource and using different antenna ports of the antenna port set; and
  a transmitter, configured to:
    send downlink control information (DCI) to the first user equipment, wherein a transmission format of the DCI is DCI 2C or DCI 2D, the DCI carries the F-PRB resource index that is allocated to the plurality of user equipment and an indication of a candidate antenna port, and the indication of the candidate antenna port is determined according to the first antenna port used to send data to the first user equipment, wherein sending the DCI to the first user equipment causes the first user equipment to determine the first antenna port according to the F-PRB resource index allocated to the first user equipment, the indication of the candidate antenna port, and the quantity that is of the F-PRBs comprised in the PRB pair and that is obtained by the first user equipment; and
    send the data to the first user equipment using the first antenna port.

11. The base station according to claim 10, wherein the program further includes instructions for determining a scrambling identity of the first user equipment, wherein the indication of the candidate antenna port is further determined according to the scrambling identity.

12. The base station according to claim 11, wherein the indication of the candidate antenna port is carried by information that indicates the first antenna port, the scrambling identity, and a layer quantity indication.

13. The base station according to claim 10, wherein the program further includes instructions for:
  determining an antenna port index according to the F-PRB resource index allocated to the first user equipment and according to the quantity of the F-PRBs comprised in the PRB pair; and
  determining the antenna port set according to the antenna port index.

14. The base station according to claim 10, wherein, when the quantity of the F-PRBs comprised in the PRB pair is 2, the indication of the candidate antenna port is further determined according to a transmission frame structure.

15. A first user equipment, comprising:
  a receiver, configured to receive downlink control information (DCI) sent by a base station, wherein a transmission format of the DCI is DCI 2C or DCI 2D, and the DCI carries an indication of a candidate antenna port and a fractional physical resource block (F-PRB) resource index, wherein the F-PRB resource index is allocated to a plurality of user equipment that includes the first user equipment, and the F-PRB resource index uniquely identifies a F-PRB resource;
  a processor; and
  a non-transitory computer-readable storage medium storing a program to be executed by the processor, the program including instructions for:
    determining an antenna port set according to the F-PRB resource index allocated to the plurality of user equipment and according to a quantity that is of F-PRBs comprised in a PRB pair and that is obtained by the first user equipment;
determining a candidate antenna port according to the indication of the candidate antenna port; and
determining, according to the antenna port set and the candidate antenna port, a first antenna port used by the base station to send data to the first user equipment, wherein different user equipment of the plurality of user equipment receive data using the same F-PRB resource and using different antenna ports of the antenna port set;
wherein the receiver is further configured to receive data sent by the base station using the first antenna port used to send data to the first user equipment.

16. The user equipment according to claim 15, wherein the program further includes instructions for:
determining an antenna port index according to the F-PRB resource index allocated to the plurality of user equipment and the quantity of the F-PRBs comprised in the PRB pair; and
determining the antenna port set according to the antenna port index.

17. The user equipment according to claim 15, wherein the program further includes instructions for, when the quantity of the F-PRBs comprised in the PRB pair is 2, determining the candidate antenna port according to a transmission frame structure.

18. The user equipment according to claim 15, wherein the indication of the candidate antenna port is carried by information that indicates the first antenna port, a scrambling identity, and a layer quantity indication.

* * * * *